(12) United States Patent
Riesel et al.

(10) Patent No.: US 8,107,122 B2
(45) Date of Patent: Jan. 31, 2012

(54) METHODS AND APPARATUS FOR PRINT JOB SUBMISSION

(75) Inventors: David Riesel, Palo Alto, CA (US); Fumiaki Okushi, Daly City, CA (US); Amit Jain, Foster City, CA (US)

(73) Assignee: Electronics For Imaging, Inc., Foster City, CA (US)

( * ) Notice: Subject to any disclaimer, the term of this patent is extended or adjusted under 35 U.S.C. 154(b) by 0 days.

(21) Appl. No.: 12/959,171

(22) Filed: Dec. 2, 2010

(65) Prior Publication Data

US 2011/0075182 A1   Mar. 31, 2011

Related U.S. Application Data

(63) Continuation of application No. 10/946,232, filed on Sep. 20, 2004, now Pat. No. 7,869,079.

(51) Int. Cl.
 *G06F 15/00* (2006.01)
(52) U.S. Cl. ...... 358/1.18; 358/1.1; 358/1.13; 358/1.15; 358/1.16; 710/52; 710/301; 710/302
(58) Field of Classification Search ............... 358/1.1, 358/1.13, 1.15, 1.16, 1.18; 710/52, 301, 710/302
See application file for complete search history.

(56) References Cited

U.S. PATENT DOCUMENTS

| 4,947,345 | A | 8/1990 | Paradise et al. |
| 6,215,559 | B1 | 4/2001 | Bryniarski et al. |
| 6,948,792 | B2 | 9/2005 | Narusawa et al. |
| 7,173,730 | B1 | 2/2007 | Suzuki et al. |
| 7,177,037 | B2 | 2/2007 | Johnson |
| 2002/0060740 | A1 | 5/2002 | Kato |
| 2003/0043395 | A1 | 3/2003 | Takahashi |
| 2003/0078963 | A1 | 4/2003 | Parry |
| 2003/0097495 | A1 | 5/2003 | Hansen |
| 2003/0126328 | A1 | 7/2003 | Reilly |
| 2004/0167974 | A1 | 8/2004 | Bunn et al. |
| 2004/0201680 | A1 | 10/2004 | Gennetten et al. |
| 2004/0218210 | A1 | 11/2004 | Shozaki et al. |
| 2005/0120149 | A1 | 6/2005 | Skarpness |

FOREIGN PATENT DOCUMENTS

EP        0949804        10/1999

OTHER PUBLICATIONS

Examination Report mailed Jan. 14, 2008 in related European patent application No. EP05795207.9, 5 pages.
IPRP mailed Mar. 29, 2007 in related PCT application PCT/US2005/032485, 8 pages.
ISR and Written Opinion mailed Mar. 27, 2006 in related PCT application PCT/US2005/032485, 12 pages.

*Primary Examiner* — David K Moore
*Assistant Examiner* — Mark Milia
(74) *Attorney, Agent, or Firm* — Michael A. Glenn; Glenn Patent Group (57) ABSTRACT

Methods and apparatus are provided for submitting an electronic document to a printing system that includes a print controller having an input port and a print queue. Methods in accordance with this invention include coupling a portable media device to the input port, the portable media device including an electronic document and automatically copying the electronic document to the print queue. Apparatus in accordance with this invention include a portable media device that includes an electronic document. The portable media device is adapted to be coupled to the input port of the print controller, and the print controller is adapted to automatically copy the electronic document to the print queue.

12 Claims, 10 Drawing Sheets

METHODS AND APPARATUS FOR PRINT JOB SUBMISSION

CROSS REFERENCE TO RELATED APPLICATIONS

This application is a continuation of U.S. patent application Ser. No. 10/946,232, filed Sep. 20, 2004 now U.S. Pat. No. 7,869,079 the entirety of which is herein incorporated by this reference thereto.

BACKGROUND OF THE INVENTION

1. Technical Field

This invention relates to print processing systems. More particularly, this invention relates to methods and apparatus for submitting print jobs to printing systems.

2. Description of the Prior Art

In recent years, software and hardware products for connecting computer equipment together to form networked computer systems has become more prevalent. For example, it is common today for computers to be connected together in computer networks. Such networked computer systems allow users to freely communicate information with one another. In addition, computer networks allow multiple computers to share computer resources, such as printers, copiers, facsimile machines, storage devices and other computer resources.

Figure 1:
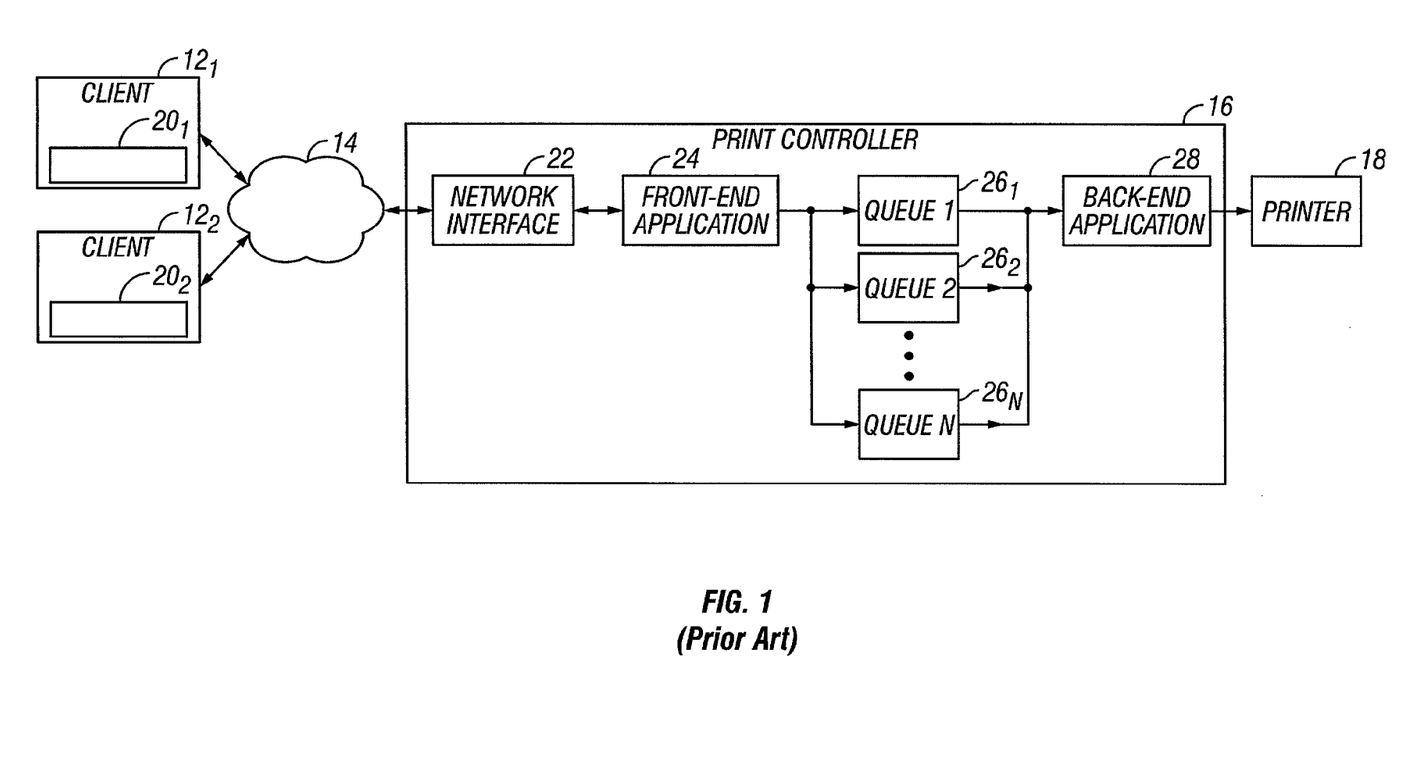
FIG. 1 is a block diagram of a previously known networked printing system 10.

For example, FIG. 1 illustrates a previously known networked computer system that allows multiple users to share print output equipment. In particular, networked printing system 10 includes multiple client computers 12 coupled via network 14 to print controller 16 and printer 18. Client computers 12 may be desktop computers, laptop computers, handheld computers, computer workstations, personal digital assistants, cellular telephones, or other similar client computer devices. Network 14 may be a local area network, wide area network, wireless network, cellular network, the Internet, or other similar network or combination of such networks. Print controller 16 may be a computer device that, among other things, enables a print output device, such as printer 18, to function as a networked printer. Printer 18 may be a laser printer, inkjet printer, copier, plotter, printing press, or other similar print output device.

Client computers 12 may submit print jobs to print controller 16 for printing on printer 18. For example, a user of client computer $12_1$ may issue a print command from within application program $20_1$ (e.g., a page layout program), which may then call a print driver to create a print job. The print driver may create the print job in a page description language ("PDL"), such as PostScript, and may then submit the print job to print controller 16 via network 14. Print controller 16 may receive the print job via network interface 22, such as an Ethernet network interface card. Print controller 16 may include front-end application 24, which may be used to assign the received print job to one of print queues 26. Each print queue 26 may have an associated function. For example, print queue $26_1$ may be a high-priority queue for immediate printing, print queue $26_2$ may be a normal-priority queue for printing print jobs in sequential order, print queue $26_3$ may be a queue for holding print jobs for subsequent printing, and so on.

Front-end application 24 may include software that assigns incoming print jobs to print queues 26 based on various user-specified options. For example, if a user specifies that a print job is a "rush" job that requires immediate printing, front-end application 24 may assign the rush print job to print queue $26_1$. In contrast, if a user does not request priority processing, front-end application 24 may assign the normal-priority print job to print queue $26_2$. Back-end application 28 may include software and/or hardware that de-spools print jobs from print queues 26, converts print jobs from PDL to raster data, and then provides the raster data to printer 18 for printing.

Although this print workflow may be appropriate for many printing requirements, there are numerous instances in which such a networked print workflow is inconvenient or inapplicable. For example, a user without network access (e.g., a visitor) may find it very difficult to print a document on networked printing system 10. To do so, the visitor typically must send or provide an electronic copy of the document to a user of one of client computers 12 (e.g., via email), who may then submit the print job via network 14 to print controller 16. If the visitor does not have immediate email access, it may be very difficult to print the document. Although the visitor may have the document available on portable storage media (e.g., floppy disk), the computer usage policy at the visiting site may prohibit visitors from using client computers 12 for network printing. Further, the visitor may be reluctant to provide electronic copies of the document in this manner because the content may be easily copied by the user, or the content may be intercepted by an unauthorized user of network 14.

Likewise, previously known networked printing system 10 may be inappropriate for printing sensitive material, particularly if print controller 16 and printer 18 are located in a common area that may be accessed by numerous users. For example, a user of client computer $12_1$ may want to submit a confidential print job to print controller 16 for printing on printer 18. To prevent unintended viewing of the document by other users, the user may submit the print job, and then attempt to reach the printer 18 before printing begins. The user may not make it in time, or may get distracted on the way to printer 18. As a result, the document may be viewed by other users and document security may be compromised.

One possible solution to these problems is to provide print jobs to print controller 16 via portable storage media, such as a magnetic or optical disk. For example, if print controller 16 includes a CD-ROM drive and a user interface, the user may load a CD that includes a desired print job into the CD-ROM drive, and may then transfer the print job from the CD to one of print queues 26 via the user interface. Although this may solve the above-mentioned network access and security problems, this solution may be prohibitively costly, and may create other more serious security concerns. In particular, the addition of a dedicated magnetic or optical disk drive and user interface may substantially increase the cost of print controller 16, and therefore may be undesirable. As a result, many low-cost print controllers may not include such dedicated hardware, and thus this solution may not be available in all instances. Further, a system operator may be reluctant to provide a print controller 16 with a user interface that may be accessible to all users for fear that such access may be used to disrupt system resources.

In view of the foregoing, it would be desirable to provide methods and apparatus for submitting print jobs to networked print devices without requiring network access.

It further would be desirable to provide methods and apparatus for submitting print jobs to a networked print controller without requiring that the print controller include dedicated magnetic or optical storage readers.

It also would be desirable to provide methods and apparatus for submitting print jobs to a networked print controller without requiring that the print controller include a user interface.

SUMMARY

In view of the foregoing, it is an object of this invention to provide methods and apparatus for submitting print jobs to networked print devices without requiring network access.

It further is an object of this invention to provide methods and apparatus for submitting print jobs to a networked print controller without requiring that the print controller include dedicated magnetic or optical storage readers.

It also is an object of this invention to provide methods and apparatus for submitting print jobs to a networked print controller without requiring that the print controller include a user interface.

These and other objects of this invention are accomplished by providing methods and apparatus for submitting an electronic document to a printing system that includes a print controller having an input port and a print queue. In particular, methods in accordance with this invention include coupling a portable media device to the input port, the portable media device including an electronic document, and automatically copying the electronic document to the print queue. Apparatus in accordance with this invention include a portable media device that includes an electronic document. The portable media device is adapted to be coupled to the input port of the print controller, and the print controller is adapted to automatically copy the electronic document to the print queue.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which.

DETAILED DESCRIPTION

Figure 2:
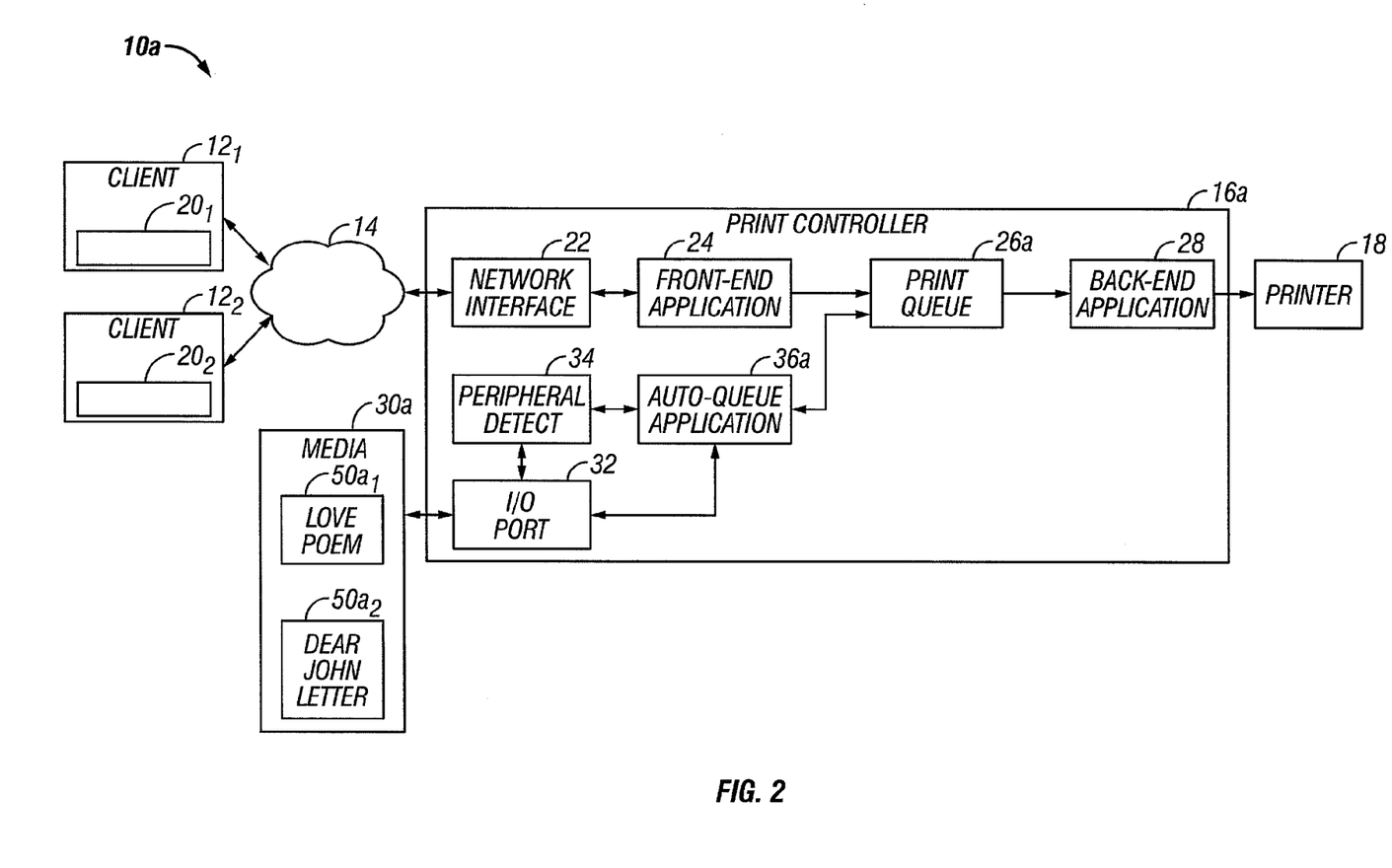
FIG. 2 is a block diagram of an exemplary printing system in accordance with this invention.

Referring now to FIG. 2, an exemplary printing system in accordance with this invention is described. In particular, printing system 10a includes portable media device 30a coupled via input/output ("I/O") port 32 to print controller 16a. Portable media device 30a may be a floppy disk, ZIP disk, optical disk, removable hard disk, microdrive, xD picture card, memory stick, SmartMedia, flash memory, universal serial bus ("USB") memory storage device or other similar portable media device. Portable media device 30a may include print jobs $50a_1$ ("Love Poem") and $50a_2$ ("Dear John Letter"). I/O port 32 may be a USB, High Performance Serial Bus (commonly called "FireWire"), or other similar I/O port. Depending on the device type, portable media device 30a may be directly connected to I/O port 32, or may be connected via a portable media drive device. For example, if portable media device 30a is a USB memory device, and I/O port 32 is a USB port, the portable media device may be plugged directly into I/O port 32. Alternatively, if portable media device 30a is a ZIP disk, and I/O port 32 is a FireWire port, the ZIP disk may be plugged into a portable ZIP drive that may be connected to I/O port 32 via a FireWire cable.

Print controller 16a may be a Fiery®, EDOX® or Splash® print controller by Electronics for Imaging, Inc., Foster City, Calif., U.S.A., or similar print controller. Printer 18 may be a laser printer, inkjet printer, dye-sublimation printer, copier, plotter, printing press, or other similar print output device. Print controller 16a may be separate from printer 18, such as a standalone print controller. Alternatively, print controller 16a may be included within the hardware and/or firmware of printer 18, such as in an embedded print controller.

Print controller 16a may include print queue 26a for receiving print jobs. Print controller 16a also may include back-end application 28, which may include software and/or hardware that may be used to de-spool print jobs from print queue 26a, convert the de-spooled print jobs to raster data, and then provide the raster data to printer 18 for printing.

Print controller 16a also may include peripheral detect application 34 and auto-queue application 36a. Peripheral detect application 34 may include hardware and/or software that may be used to invoke auto-queue application 36a when a peripheral device has been connected to I/O port 32. For example, if print controller 16a includes a Linux operating system, peripheral detect application 34 may include a "hot-plug" service that may be used to invoke auto-queue application 36a when a USB device has been connected to a USB I/O port 32. Similarly, if print controller 16a includes a Microsoft Windows operating system, peripheral detect application 34 may include a "plug and play" service that may be configured to invoke auto-queue application 36a when a FireWire memory device has been connected to a FireWire I/O port 32. Persons of ordinary skill in the art will understand that peripheral detect application 34 may be used to detect other types of peripheral devices that are coupled to other types of I/O ports on print controller 16a.

Peripheral detect application 34 also may provide auto-queue application 36a with information to identify the type of peripheral device coupled to I/O port 32. For example, each peripheral device that may be coupled to I/O port 32 may have an associated type code that identifies the device type. Thus, a first type code may be associated with USB portable memory devices, a second type code may be associated with FireWire memory devices, a third type code may be associated with USB keyboards, and so on. When a peripheral device is coupled to I/O port 32, peripheral detect application 34 may detect the type code associated with the peripheral device, invoke auto-queue application 36a, and provide the detected type code to the auto-queue application.

Figure 3:
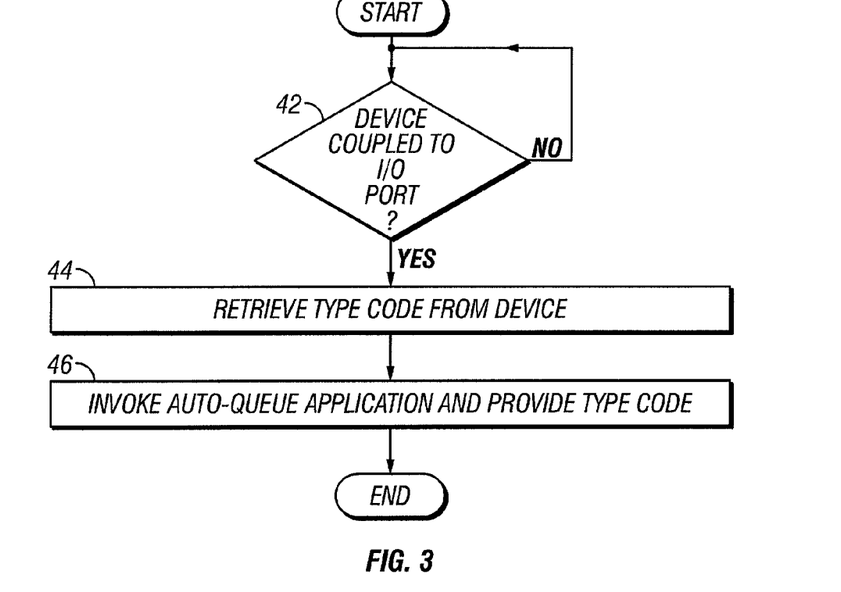
FIG. 3 is a flow diagram of an exemplary peripheral detection process in accordance with this invention.

FIG. 3 illustrates an exemplary peripheral detection process 40 performed by peripheral detect application 34. Beginning at step 42, peripheral detect application 34 checks for the presence of a peripheral device connected to I/O port 32. For example, peripheral detect application 34 may periodically poll I/O port 32 to detect the presence of a connected peripheral device. If no device is detected, the process returns to step 42 and continues to check for the presence of a connected peripheral device. If, however, peripheral detect application 34 detects a connected device, the process proceeds to step 44, wherein peripheral detect application 34 retrieves the associated type code from the connected device. At step 46, peripheral detect application 34 invokes auto-queue application 36a, and provides the auto-queue application with the type code retrieved at step 44. Process 40 then terminates.

Referring again to FIG. 2, auto-queue application 36a may be software and/or hardware that receives from peripheral detect application 34 the type code associated with the connected peripheral device, and determines if the received type code corresponds to a type of device (e.g., portable media device 30a) that may be used to store print jobs. If so, auto-queue application 36a may then copy print jobs from portable media device 30a to print queue 26a. Once the print jobs have been copied to print queue 26a, back-end application 28 de-spools the print jobs from print queue 26a, converts print jobs to raster data, and then provides the raster data to printer 18 for printing.

Figure 4:
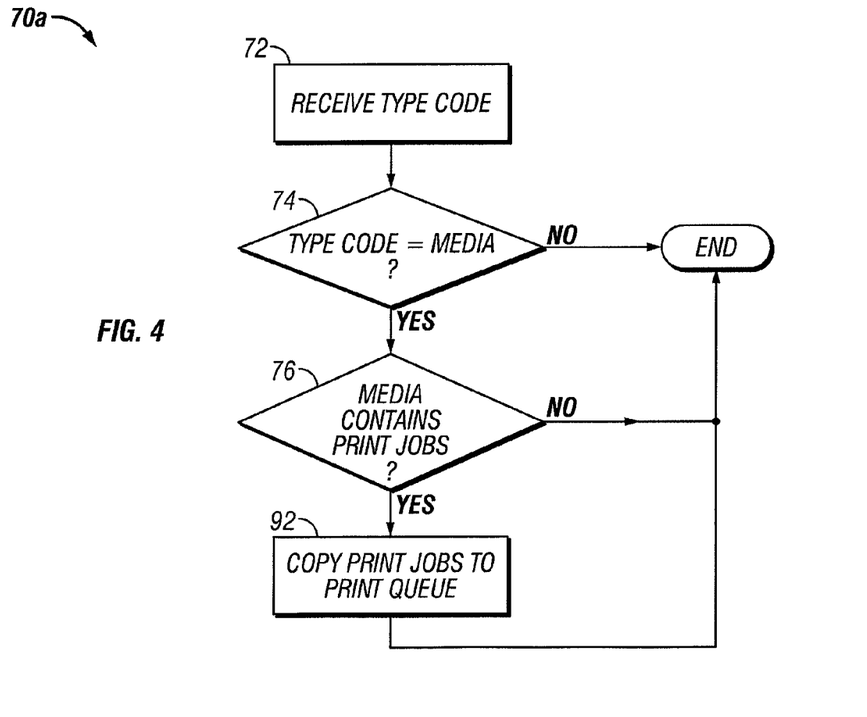
FIG. 4 is a flow diagram of an exemplary auto-queue process in accordance with this invention.

An exemplary auto-queue process 70a implemented by auto-queue application 36a is described with reference to FIGS. 2 and 4. In particular, beginning at step 72, auto-queue application 36a receives from peripheral detect application 34 the type code retrieved from the device coupled to I/O port 32. Next, at step 74, auto-queue application 36a determines if the received type code corresponds to a portable media device that may include stored print jobs. If not, the process ends. If, however, the received type code corresponds to such a portable media device (e.g., portable media device 30a), the process continues to step 76, and the auto-queue application determines if portable media device 30a includes any print jobs 50a. In this regard, auto-queue application 36a may search for files having file formats typically associated with print jobs, such as PostScript, PDF, PCL, TIFF, JPEG, or other similar file types. If portable media device 30a does not contain any print jobs 50a, the process ends. If, however, portable media device 30a includes print jobs 50a, the process proceeds to step 92, wherein print jobs 50a are copied to print queue 26a. Auto-queue process 70a then ends.

After print jobs 50a have been copied to print queue 26a, back-end application 28 de-spools print jobs 50a from print queue 26a, converts print jobs to raster data, and then provides the raster data to printer 18 for printing. Print jobs 50a may therefore be printed by print controller 16a and printer 18 without requiring that a user have access to network 14, or that print controller 16a include a dedicated magnetic or optical storage reader or user interface.

Figure 5:
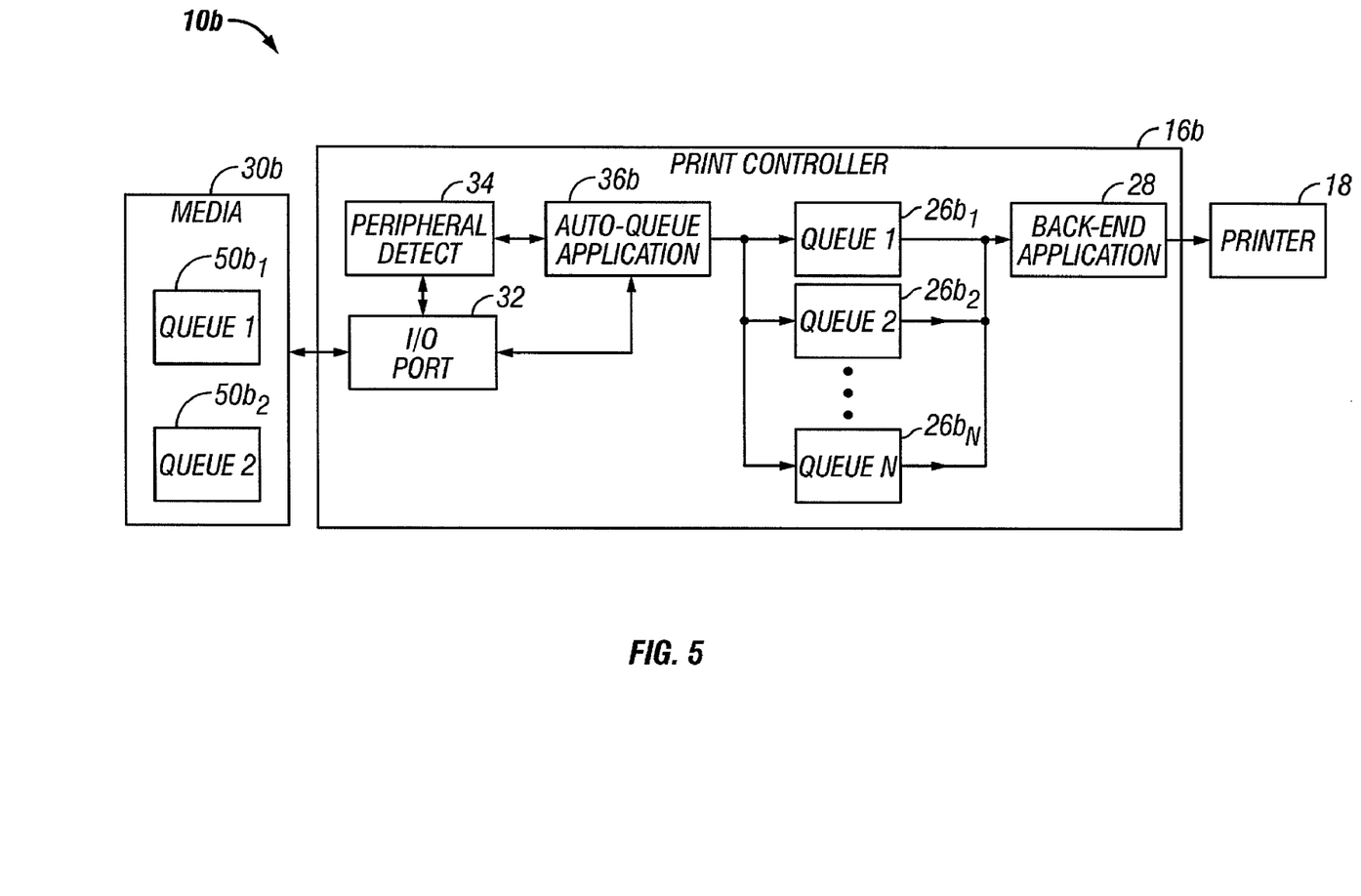
FIG. 5 is a block diagram of an alternative exemplary printing system in accordance with this invention.

Referring now to FIG. 5, an alternative exemplary print system in accordance with this invention is described. In particular, print system 10b includes portable media device 30b coupled via I/O port 32 to print controller 16b. For simplicity, client computers 12, network 14, network interface 22 and front-end application 24 have been removed from the drawing, although such elements may be part of print system 10b. Print controller 16b may include multiple print queues $26b_1, 26b_2, \ldots 26b_N$ for receiving print jobs, with each print queue having an associated name that may be used to uniquely identify the print queue. For example, print controller 16b may include print queues $26b_1, 26b_2, \ldots 26b_N$ having associated names "Queue 1, " "Queue 2, " . . . , and "Queue N," respectively, that may be used to uniquely identify the print queues.

Auto-queue application 36b may be software and/or hardware that receives from peripheral detect application 34 the type code associated with the connected peripheral device, and determines if the received type code corresponds to a type of device (e.g., portable media device 30b) that may be used to store print jobs. If so, auto-queue application 36b may then copy print jobs from portable media device 30b to print queues $26b_1, 26b_2, \ldots 26b_N$ based on queue assignment information included on portable media device 30b. Once the print jobs have been copied to print queue 26b, back-end application 28 de-spools the print jobs from print queue 26b, converts print jobs to raster data, and then provides the raster data to printer 18 for printing.

In this example, queue assignment information is included in the name of each print job 50b. That is, the name of each print job 50b indicates the print queue 26b that will receive a copy of the print job. Thus, if a user would like to have a print job $50b_1$ processed in a desired print queue 26b (e.g., print queue $26b_1$, named "Queue 1"), the user may name the print job "Queue 1." Similarly, if a user would like to have a print job $50b_2$ processed in another desired print queue 26b (e.g., print queue $26b_4$, named "Queue 2"), the user may name the print job "Queue 2." When portable media device 30b is connected to I/O port 32, peripheral detect application 34 invokes auto-queue application 36b, which copies print jobs 50b from portable media device 30b to print queues 26b based on print job names.

Figure 6:
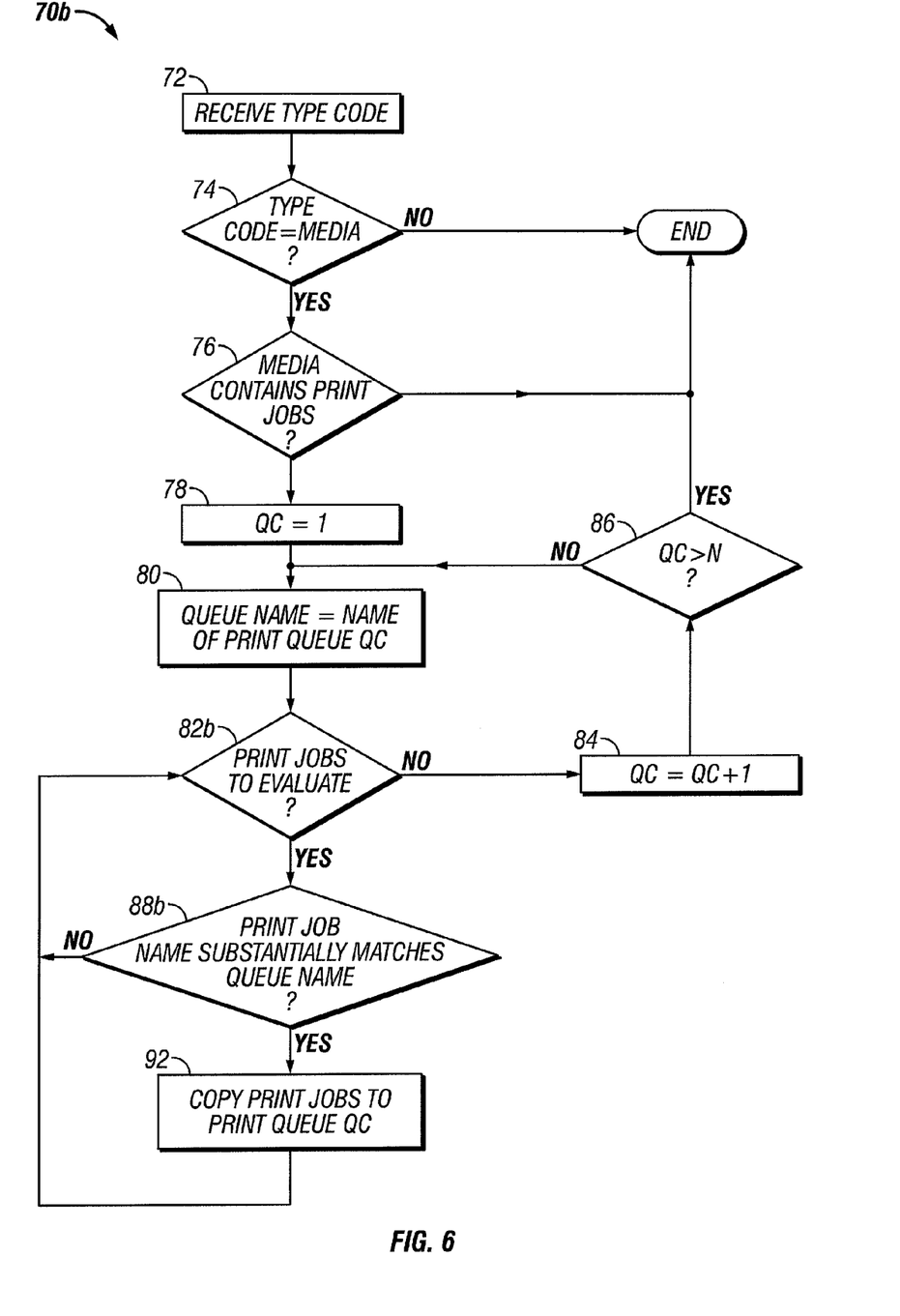
FIG. 6 is a flow diagram of an alternative exemplary auto-queue process in accordance with this invention.

An exemplary auto-queue process 70b implemented by auto-queue application 36b is described with reference to FIGS. 5 and 6. In this exemplary process, auto-queue application 36b first determines if the device coupled to I/O port 32 is a portable media device. If so, auto-queue application 36b examines each print job 50b on the portable media device, comparing the name of each print job 50b with the name of each print queue $26b_1, 26b_2, \ldots 26b_N$. If the name of print job 50b substantially matches the name of a print queue 26b, auto-queue application 36b copies the print job 50b to the print queue 26b.

In particular, beginning at step 72, auto-queue application 36b receives from peripheral detect application 34 the type code retrieved from the device coupled to I/O port 32. Next, at step 74, auto-queue application 36b determines if the received type code corresponds to a portable media device that may include stored print jobs. If not, the process ends. If, however, the received type code corresponds to such a portable media device (e.g., portable media device 30b), the process continues to step 76, and the auto-queue application determines if portable media device 30b includes any print jobs 50b. In this regard, auto-queue application 36b may search for files having file formats typically associated with print jobs, such as PostScript, PDF, PCL, TIFF, JPEG, or other similar file types. If portable media device 30b does not contain any print jobs 50b, the process ends. If, however, portable media device 30b includes print jobs 50b, the process proceeds to step 78, wherein a variable QC is reset to an initial value (e.g., 1). QC may be an integer variable having values 1, 2, . . . N, corresponding to print queues $26b_1$, $26b_2, \ldots 26b_N$, respectively. At step 80, a variable Queue Name is set to the name associated with print queue $26b_{QC}$. Thus, for QC=1, Queue Name="Queue 1." For QC=2, Queue Name="Queue 2, " and so on.

Next, at step 82b auto-queue application 36b determines if portable media device 30b includes any print jobs 50b that must be evaluated, as described below. If there are no such print jobs 50b, at step 84 QC is incremented by 1. At step 86, the value of QC is compared to N. If QC is greater than N, the process stops. If, however, QC is less than or equal to N, the process returns to step 80, wherein variable Queue Name is set to the name associated with print queue $26b_{QC}$. At step 82b, auto-queue application 36b again determines if media device 30b includes any print jobs 50b that must be evaluated. This process continues until all print queues $26b_1, 26b_2, \ldots, 26b_N$ have been evaluated.

If at step 82b auto-queue application 36b determines that portable media device 30b includes a print job 50b that must be evaluated, the process continues to step 88b, wherein auto-queue application 36b determines if the name of print job 50b substantially matches Queue Name. If not, the process returns to step 82b to determine if portable media device 30b includes any other print jobs 50b that must be evaluated. This iterative process continues until the name of each of print jobs 50b has been compared to Queue Name. If at step 88b auto-queue application 36b determines that portable media device 30b includes a print job 50b having the a name that substantially matches Queue Name, the process continues to step 92, wherein the print job 50b is copied to print queue $26b_{QC}$. The process then proceeds to step 82b, as described above.

In this regard, auto-queue application 36b iteratively compares the name of each print job 50b with the name of each print queue 26b, and copies print jobs 50b to the corresponding print queue 26b whose name substantially matches the print job name. After print jobs 50b have been copied to the appropriate print queue 26b, back-end application 28 de-spools print jobs 50b from print queues 26b, converts print jobs to raster data, and then provides the raster data to printer 18 for printing.

Figure 7:
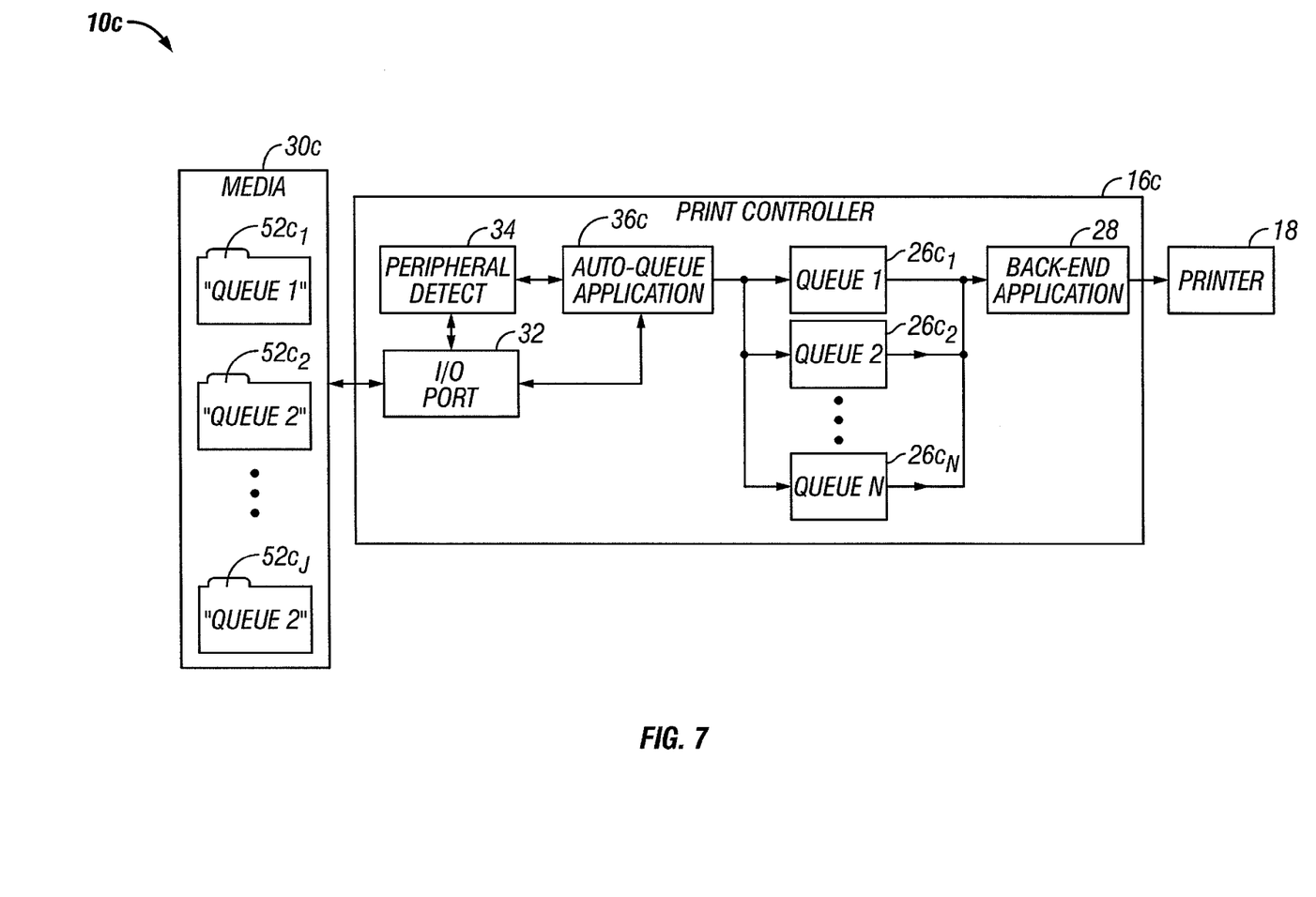
FIG. 7 is a block diagram of another alternative exemplary printing system in accordance with this invention.

Referring now to FIG. 7, another exemplary print system in accordance with this invention is described. In particular, print system 10c includes portable media device 30c coupled via I/O port 32 to print controller 16c, which is coupled to printer 18. Print controller 16c includes auto-queue application 36c, which also may copy print jobs from portable media device 30c to print queue 26c based on queue assignment information included on portable media device 30c.

Figure 8A:
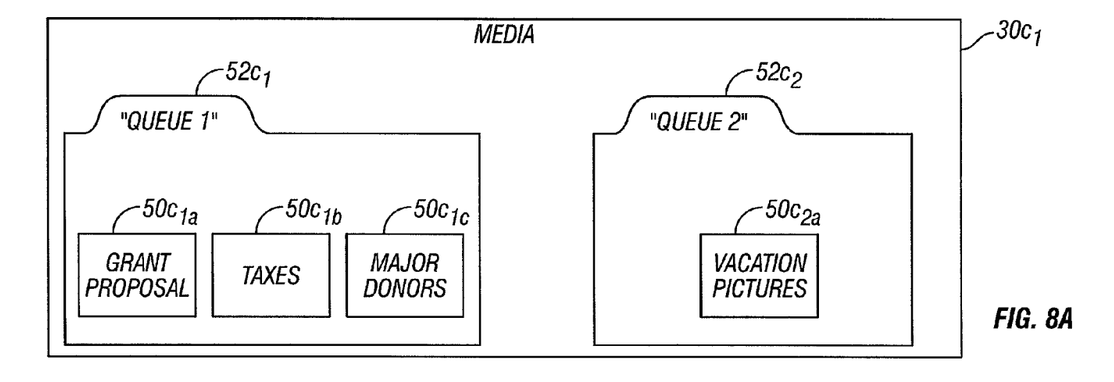
FIGS. 8A and 8B are diagrams of exemplary portable media devices for use with methods and apparatus in accordance with this invention.
Figure 8B:
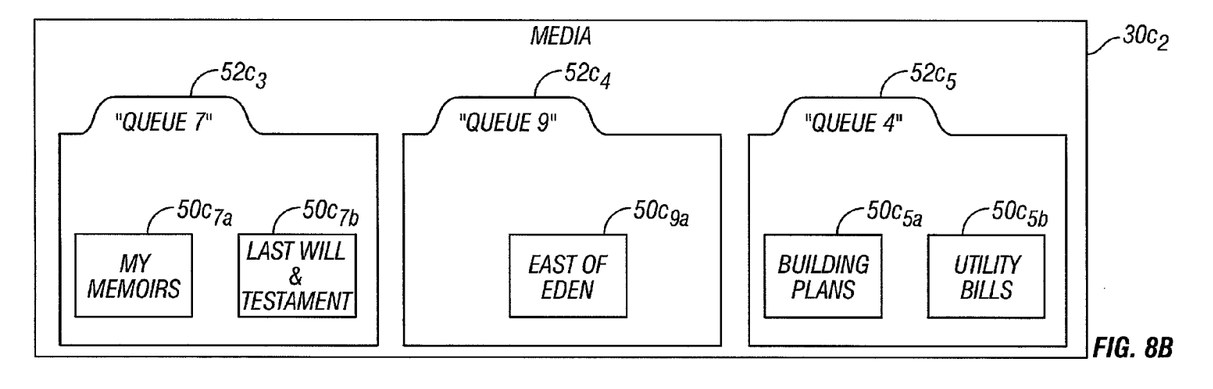

In this example, queue assignment information is included in the name associated with folders included in portable media device 30c. Referring now to FIGS. 8A and 8B, exemplary portable media devices $30c_1$ and $30c_2$, respectively, are described. In particular, portable media device $30c_1$ may include folder $52c_1$, named "Queue 1" and folder $52c_2$, named "Queue 2, " and portable media device $30c_2$ may include folder $52c_3$, named "Queue 7, " folder $52c_4$, named "Queue 9, " and folder $52c_5$, named "Queue 4." Folder $52c_1$ may include print jobs $50c_{1a}$ ("Grant Proposal"), $50c_{1b}$ ("Taxes") and $50c_{1c}$ ("Major Donors"), folder $52c_2$ may include print job $50c_2$, ("Vacation Pictures"), folder $52c_3$ may include print jobs $50c_{7a}$ ("My Memoirs") and $50c_{7b}$ ("Last Will & Testament"), folder $52c_4$ may include print job $50c_{9a}$ ("East of Eden"), and folder $52c_5$ may include print jobs $50c_{5a}$ ("Building Plans") and $50c_{5b}$ ("Utility Bills").

In this exemplary system, queue assignment information is included in the name associated with each folder 52c. That is, the name of each folder 52c indicates the print queue 26c that will receive print jobs 50c included in the folder. Thus, if a user would like to have a print job 50c processed in a desired print queue 26c (e.g., print queue $26c_1$, named "Queue 1"), the user may create a folder 52c in portable media device 30c that has an associated name "Queue 1, " and may then include the print job in the "Queue 1" folder. Similarly, if a user would like to have a print job 50c processed in another desired print queue 26c (e.g., print queue $26c_4$, named "Queue 4"), the user may create a folder 52c in portable media device 30c that has an associated name "Queue 4, " and may then include the print job in the "Queue 4" folder. When portable media device 30c is connected to I/O port 32, peripheral detect application 34 invokes auto-queue application 36c, which copies print jobs 50c from portable media device 30c to print queues 26c based on the folder names included on portable media device 30c.

Figure 9:
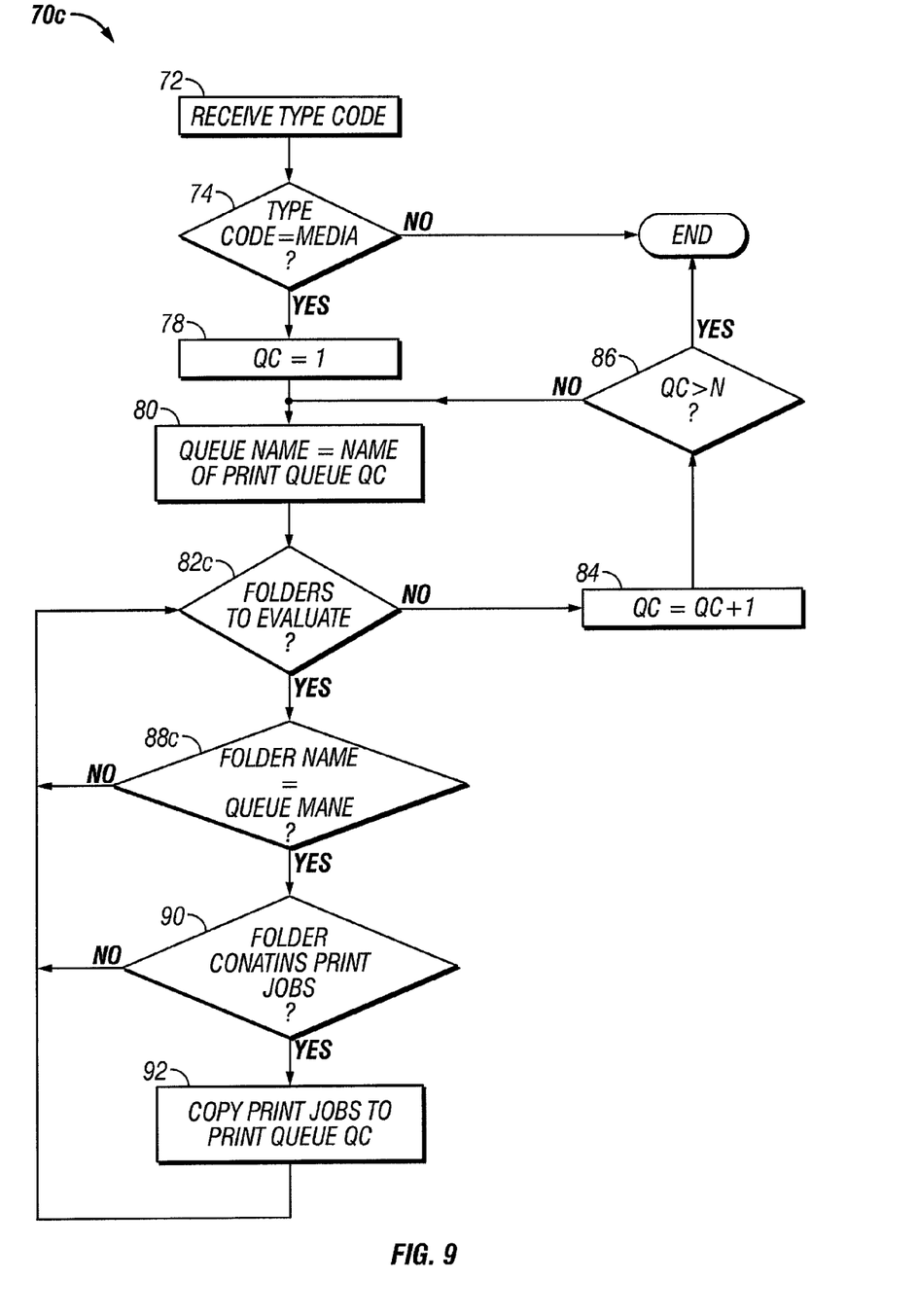
FIG. 9 is a flow diagram of another alternative exemplary auto-queue process in accordance with this invention.

An exemplary auto-queue process 70c implemented by auto-queue application 36c is described with reference to FIGS. 7 and 9. In this exemplary process, auto-queue application 36c first determines if the device coupled to I/O port 32 is a portable media device. If so, auto-queue application 36c examines each folder on the portable media device, comparing the name of each folder 52 with the name of each print queue 26. If the name of folder 52c substantially matches the name of a print queue 26c, auto-queue application 36c copies print jobs 50c to the substantially matching print queue 26c.

In particular, beginning at step 72, auto-queue application 36c receives from peripheral detect application 34 the type code retrieved from the device coupled to I/O port 32. Next, at step 74, auto-queue application 36c determines if the received type code corresponds to a portable media device that may include stored print jobs. If not, the process ends. If, however, the received type code corresponds to such a portable media device (e.g., portable media device 30c), the process continues to step 78, wherein a variable QC is reset to an initial value (e.g., 1). QC may be an integer variable having values 1, 2, . . . N, corresponding to print queues $26c_1, 26c_2, \ldots 26c_N$, respectively. At step 80, a variable Queue Name is set to the name associated with print queue $26c_{QC}$. Thus, for QC=1, Queue Name="Queue 1." For QC=2, Queue Name="Queue 2, " and so on.

Next, at step 82c auto-queue application 36c determines if portable media device 30c includes any folders 52c that must be evaluated, as described below. If there are no such folders 52c, at step 84 QC is incremented by 1. At step 86, the value of QC is compared to N. If QC is greater than N, the process stops. If, however, QC is less than or equal to N, the process returns to step 80, wherein variable Queue Name is set to the name associated with print queue $26c_{QC}$. At step 82c, auto-queue application 36c again determines if media device 30c includes any folders 52c that must be evaluated. This process continues until all print queues $26c_1, 26c_2, \ldots 26c_N$ have been evaluated.

If at step 82c auto-queue application 36c determines that portable media device 30c includes a folder 52c that must be evaluated, the process continues to step 88c, wherein auto-queue application 36c determines if the name of folder 52c substantially matches Queue Name. If not, the process returns to step 82c to determine if portable media device 30c includes any other folders 52c that must be evaluated. This iterative process continues until the name of each of folders 52c has been compared to Queue Name.

If at step 88c auto-queue application 36c determines that portable media device 30c includes a folder 52c having a name that substantially matches Queue Name, the process continues to step 90, and the auto-queue application determines if folder 52c includes any print jobs 50c. In this regard, auto-queue application 36c may search for files having file formats typically associated with print jobs, such as Post-Script, PDF, PCL, TIFF, JPEG, or other similar file types. If folder 52c does not contain any print jobs 50c, the process returns to step 82c to determine if portable media device 30c includes any other folders 52c that must be evaluated. If, however, folder 52c includes print jobs 50c, the process proceeds to step 92, wherein print jobs 50c in folder 52c are copied to print queue $26c_{QC}$. The process then proceeds to step 82c, as described above.

In this regard, auto-queue application 36c iteratively compares the name of each folder 52c with the name of each print queue 26c, and copies print jobs 50c from each folder 52c to the corresponding print queue 26c whose name substantially matches the folder name. After print jobs 50c have been copied to the appropriate print queue 26c, back-end application 28 de-spools print jobs 38 from print queues 26c, converts print jobs to raster data, and then provides the raster data to printer 18 for printing.

Figure 10:
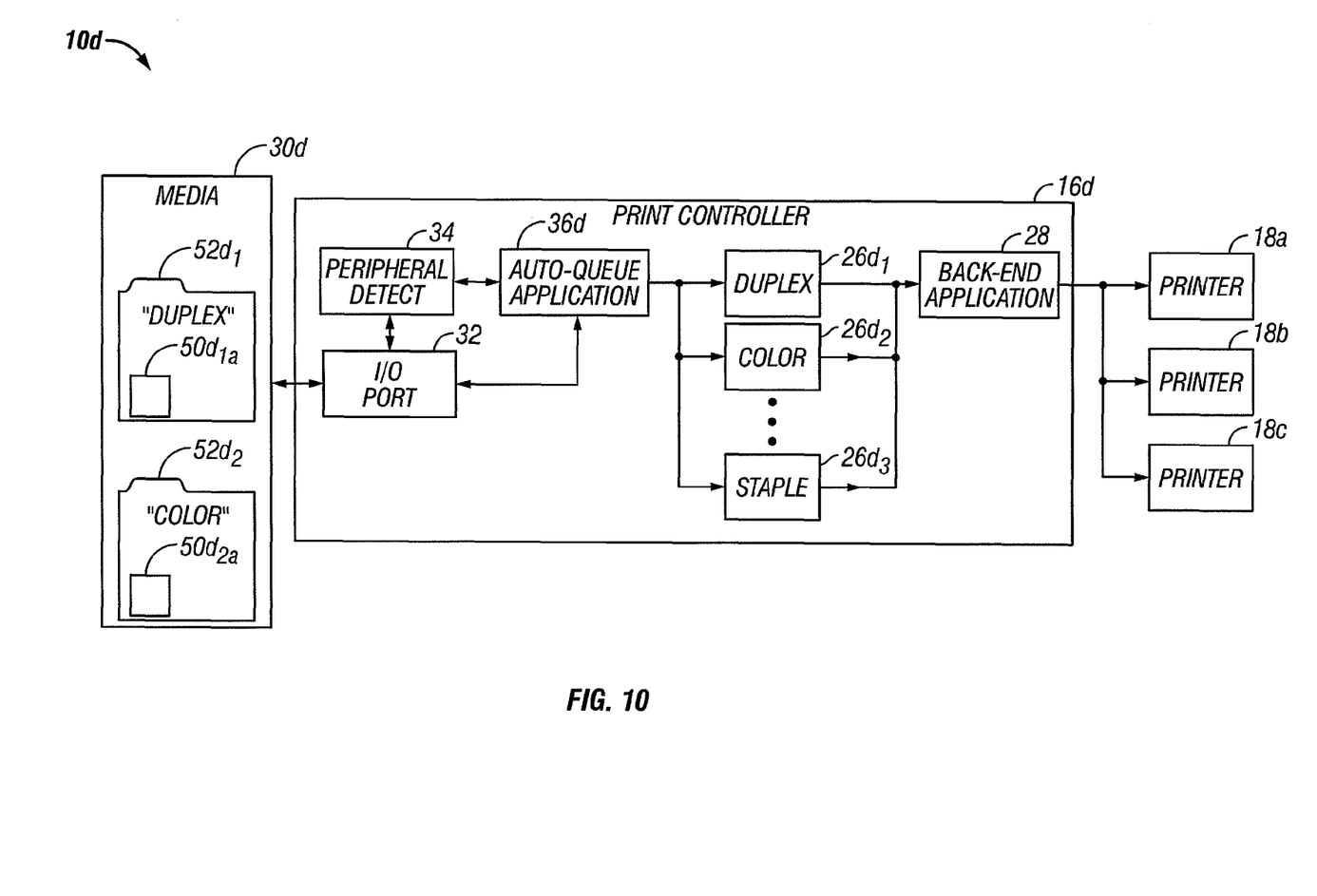
FIG. 10 is a block diagram of another alternative exemplary printing system in accordance with this invention.

Referring now to FIG. 10, another exemplary print system in accordance with this invention is described. In particular, print system 10d includes portable media device 30d coupled via I/O port 32 to print controller 16d, which is coupled to printers 18a, 18b and 18c. Print controller 16d includes print queue $26d_1$, named "Duplex," print queue $26d_2$, named "Color," and print queue $26d_3$, named "Staple." Printer 18a may include a duplex printing option, printer 18b may be a color printer, and printer 18c may include a staple option. Back end application 28 may be configured to send print jobs in Duplex print queue $26d_1$ to printer 18a with the duplex option selected, print jobs in Color print queue $26d_2$ to color printer 18b, and print jobs in Staple print queue $26d_3$ to printer 18c with the staple option selected.

Portable media 30d may include folder $52d_1$, named "Duplex," and folder $52d_2$, named "Color." Thus, if a user would like to have a print job $50d_{1a}$ duplex printed, the user may include the print job in Duplex folder $52d_1$. Similarly, if a user would like to have a print job $50d_{2a}$ printed on a color printer, the user may include the print job in Color folder $52d_2$. When portable media device 30d is connected to I/O port 32, peripheral detect application 34 invokes auto-queue application 36d, which copies print job $50d_{1a}$ from Duplex folder $52d_1$ to Duplex print queue $26d_1$, and print job $50d_{2a}$ from Color folder $52d_2$ to Color print queue $26d_2$. Back end application 28 then de-spools print jobs $50d_{1a}$ and $50d_{2a}$ from print queues $26d_1$ and $26d_2$, respectively, converts the print jobs to raster data, and then provides the raster data to printers 18a and 18b, respectively, for printing.

Figure 11:
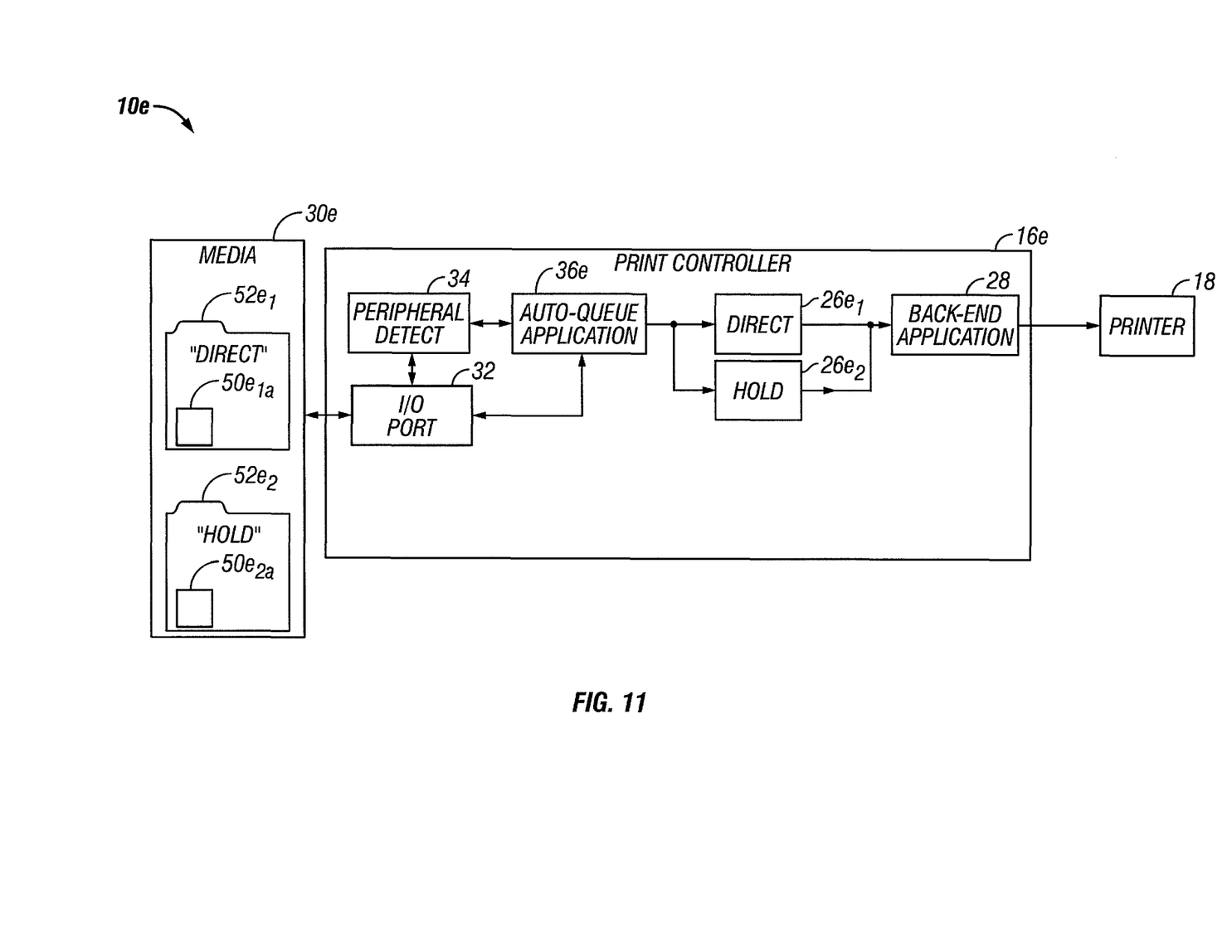
FIG. 11 is a block diagram of another alternative exemplary printing system in accordance with this invention.

As described above in connection with FIGS. 2, 5, 7 and 10, auto-queue application 36 searches portable media device 30 for files 50 having file formats typically associated with print jobs, such as PostScript, PDF, PCL, TIFF, JPEG, or other similar print job file formats. In some instances, however, a user may have documents that are not in one of these commonly used print job formats, but the user may nevertheless want to print the documents. For example, a user may have word processing (e.g., Corel WordPerfect), spreadsheet (e.g., Microsoft Excel), presentation graphics (e.g., Microsoft PowerPoint), page layout (e.g., Adobe Page Maker), computer aided design (e.g., Autodesk AutoCAD), image (e.g., bitmap), graphics (e.g., Apple MAC), markup (e.g., hypertext markup language ("HTML"), standard generalized markup language ("SGML"), extensible markup language ("XML")) or other similar "non-print job" format documents. FIG. 11 illustrates an alternative exemplary print system in accordance with this invention that may be used to print such non-print job format documents.

In particular, print system 10e includes portable media device 30e coupled to print controller 16e, which includes auto-queue application 36e, print queue $26e_1$, named "Direct," and print queue $26e_2$, named "Hold." Portable media device 30e may include folder $52e_1$, named "Direct," which may include Microsoft Word document $50e_{1a}$, and folder $52e_2$, named "Hold," which may include Word Perfect document $50e_{2a}$. When portable media device 30e is coupled to I/O port 32, auto-queue application 36e converts Microsoft Word document $50e_{1a}$ to PDF format, and then copies the PDF document to Direct print queue $26e_1$. Similarly, auto-queue application 36e converts Word Perfect document $50e_{2a}$ to PDF format, and then copies the PDF document to Hold print queue $26e_2$.

In this regard, auto-queue application 36e may include hardware and/or software that may be used to convert files 50e having any of a first set of formats (e.g., word processing, spreadsheet, presentation graphics, page layout, computer aided design, image, graphics or markup) to corresponding files in any of a second set of formats (e.g., PostScript, PDF, PCL, TIFF, JPEG, or other similar print job format). For example, auto-queue application 36e may include software such as Microsoft Office, WordPerfect Office, OpenOffice-.org productivity suite, or other similar software that may be used to convert documents from commonly used office application programs to PostScript, PDF, PCL, TIFF, JPEG, or other similar print job formats.

Alternatively, auto-queue application 36e may include hardware and/or software that may be used to send files 50e having any of a first set of formats (e.g., word processing, spreadsheet, presentation graphics, page layout, computer aided design, image, graphics or markup) to a server computer (not shown) for conversion to PostScript, PDF, PCL, TIFF, JPEG, or other similar print job formats. In this regard, the server computer may include includes software such as Microsoft Office, WordPerfect Office, OpenOffice.org productivity suite, or other similar software that may be used to convert documents from commonly used office application programs to PostScript, PDF, PCL, TIFF, JPEG, or other similar print job formats. After the server computer performs the conversion, the server computer may send the converted print job format documents to auto-queue application 36e for submission to print queues 26.

Persons of ordinary skill in the art will understand that various modifications can be made to this invention without departing from the scope and spirit of the invention. For example, auto-queue application 36 may include hardware and/or software that may limit the number of times that files 50 on portable media 30a may be copied to print queues 26. Thus, for example, portable media 30 may include an electronic copy of a book 50 that may be licensed or sold for single use printing on print controller 16 and printers 18. Alternatively, auto-queue application 36 may include hardware and/ or software that may copy files 50 to print queues 26 only if the files 50 do not already exist on print queues 26, or only if the files 50 have been modified compared to the corresponding files in print queues 26.

Additionally, any of print controllers 16a-16e may include a user interface that may be used to manually select print jobs 50 from portable media 30 for copying to any of print queues 26 and printing by printer 18. In this regard, the user interface may be used to select print jobs from that are stored on portable media 30, but that do not have names or are not stored in folders 52 having names that include the names of print queues 26. Persons of ordinary skill in the art will understand that that other modifications also may be made without departing from the scope and spirit of this invention.

The invention claimed is:

1. A printing system comprising:
   a print controller comprising:
   a universal serial bus port;
   a plurality of individually identifiable print queues identified by a queue name that specifies one or more print finishing options; and
   a processor and a memory device, said processor configured for executing a peripheral device detection application and an auto-queue application;
   a printer operatively coupled to said print controller;

a universal serial bus memory storage device configured for storing at least one electronic document in one or more folders having a folder identifier that substantially matches said queue name, wherein the universal serial bus memory storage device adapted to be coupled to the universal serial bus port;

wherein the peripheral device detection application of said print controller is configured to detect when said universal serial bus memory storage device is coupled to said input port;

wherein, upon detection of said universal serial bus memory storage device, said auto-queue application of said print controller is configured to copy the at least one electronic document from said one or more folder to the individually identifiable print queue having a queue name that substantially matches said folder identifier, and wherein said processor automatically initiates, upon auto-detection, one or more print job of said at least one electronic document, wherein said print job includes print finishing options corresponding to said queue name.

2. The printing system of claim 1, wherein the universal serial bus memory storage device is adapted to be directly coupled to the universal serial bus port.

3. The printing system of claim 1, wherein the universal serial bus memory storage device is adapted to be coupled to the universal serial bus port via a universal serial bus memory storage drive device.

4. The printing system of claim 1, wherein the print controller further comprises a plurality of print queues, each print queue comprising an associated name, wherein: the queue assignment information comprises a name associated with the electronic document; the print controller is further adapted to copy the electronic document to the print queue whose name substantially matches the electronic document name the universal serial bus memory storage device comprises a folder; the queue assignment information comprises a name associated with the folder; and the print controller is further adapted to copy the electronic document to the print queue whose name substantially matches the folder name.

5. The printing system of claim 1, wherein the print job comprises at least one of a PostScript, PDF, PCL, TIFF, or JPEG format.

6. The printing system of claim 1, wherein the electronic document comprises a first format and the print controller is further adapted to convert the copy of the electronic document to a second format, wherein the first format comprises at least one of a word processing, spreadsheet, presentation graphics, page layout, computer aided design, image, graphics or markup format, and wherein the second format comprises at least one of a PostScript, PDF, PCL, TIFF, or JPEG format.

7. A method for submitting an electronic document to a print controller having a universal serial bus port and a plurality of individually identifiable print queues identified by a queue name that specifies one or more print finishing options, the method comprising:

coupling a printer with a print controller comprising a universal serial bus port, a print queue plurality of individually identifiable print queues identified by a queue name that specifies one or more print finishing options, a processor, and a memory device;

configuring said processor for executing a peripheral device detection application and an auto-queue application;

coupling a universal serial bus memory storage device to the universal serial bus port, the universal serial bus memory storage device configured for storing at least one electronic document in one or more folders having a folder identifier that substantially matches said queue name, and wherein said universal serial bus is configured for storing queue assignment information, wherein the step of coupling causes the processor to perform the steps of:

detecting when said universal serial bus memory storage device is coupled to said universal serial bus port;

copying the electronic document to the print queue based on the queue assignment information; and automatically initiating a print job on said printer according to said queue assignment information, wherein said print job is printed according to said finishing options.

8. The method of claim 7, wherein coupling step is selected from among a group of coupling steps consisting of directly coupling the universal serial bus memory storage device to the universal serial bus port and coupling the universal serial bus memory storage device to the universal serial bus port via a universal serial bus memory storage drive device.

9. The method of claim 7, wherein the print job comprises a page description language.

10. The method of claim 7, wherein the electronic document comprises at least one of a PostScript, PDF, PCL, TIFF, or JPEG format.

11. The method of claim 7, wherein the electronic document comprises a first format, and the print controller is further adapted to convert the copy of the electronic document to a second format.

12. The method of claim 11, wherein the first format comprises at least one of a word processing, spreadsheet, presentation graphics, page layout, computer aided design, image, graphics or markup format, and wherein the second format comprises at least one of a PostScript, PDF, PCL, TIFF, or JPEG format.

* * * * *